May 23, 1961  L. G. OXFORD ET AL  2,984,892
CUTTING OR ABRADING TOOLS
Filed May 26, 1958  3 Sheets-Sheet 1
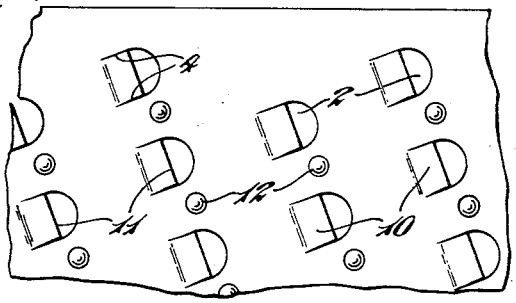
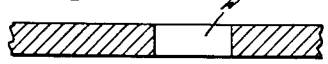
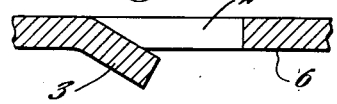
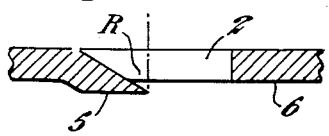
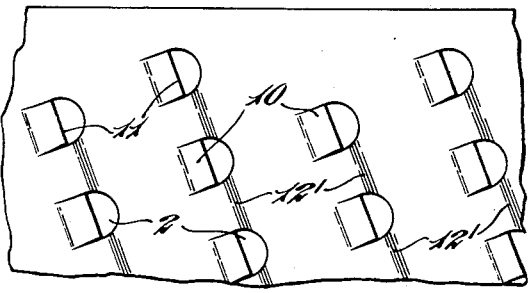
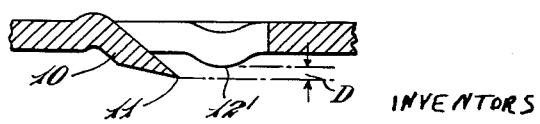
INVENTORS
Christopher Hodgson Booth and Leonard George Oxford
By
Watson, Cole, Grindle & Watson
ATTORNEYS

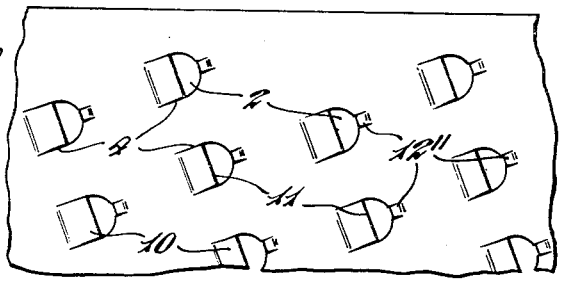
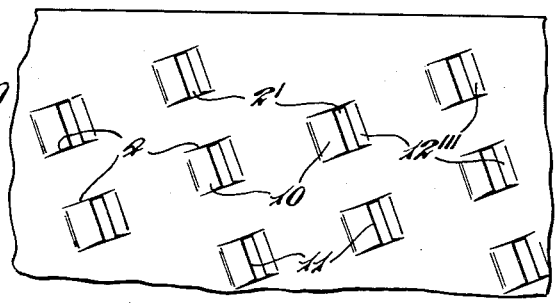
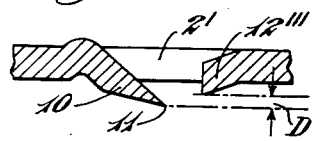
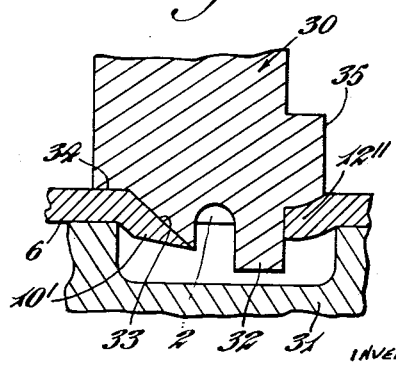

May 23, 1961   L. G. OXFORD ET AL   2,984,892
CUTTING OR ABRADING TOOLS
Filed May 26, 1958   3 Sheets-Sheet 3
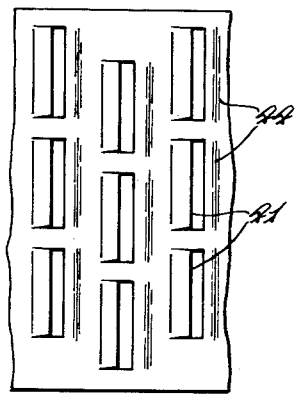
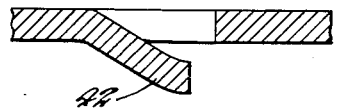
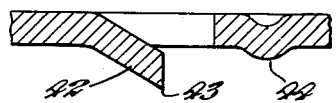
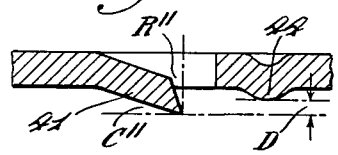
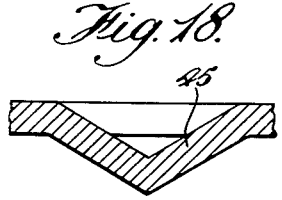
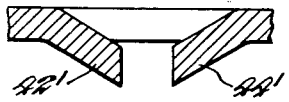
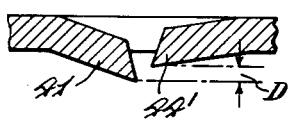
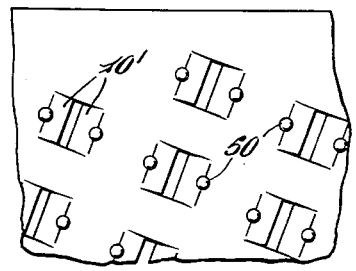
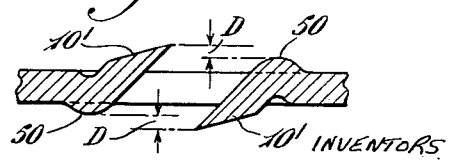
INVENTORS
Christopher Hodgson Booth and Leonard George Oxford
By
Watson, Cole, Grindle & Watson
ATTORNEYS

United States Patent Office 2,984,892
Patented May 23, 1961

2,984,892
CUTTING OR ABRADING TOOLS

Leonard G. Oxford, West Orchard, Fairwater Road, Llandaff, near Cardiff, Wales, and Christopher H. Booth, 3 Tyning End, Widcombe Hill, Bath, Somerset, England, assignors to Simmonds Aerocessories Limited, Glamorganshire, Wales Filed May 26, 1958, Ser. No. 737,798

Claims priority, application Great Britain May 29, 1957

3 Claims. (Cl. 29—78)

This invention relates to cutting and abrading tools of the kind comprising a cutting element of sheet metal having a multiplicity of cutting edges having positive rake angles which edges are provided by marginal portions of holes formed in the element. Tools and cutting elements of this kind, which is hereinafter called "the kind described," are described inter alia in British patent specifications Nos. 666,573; 666,621; 666,622; 695,830 and 695,- 859. In the latter specification there is described and claimed a multi-edge cutting tool having cutting edges with positive rake and clearance angles and having at least some of the edges divided along their length into parts and, between the parts of each edge so divided, non-cutting ramp-like surfaces below the cutting edges by an amount equal to the maximum permissible depth of cut desired, whereby when the edge is cutting to its maximum depth the non-cutting surfaces rub on the work and so prevent the edge from cutting deeper: a preferred form of this cutting tool is of the kind described where the sheet metal element is ridged and has its teeth projecting from the ridges. By this arrangement the positive rake cutting edges are prevented from digging into the work and jamming: the positive rake enables efficient cutting and the smooth surfaces and limited areas in contact with the work reduce friction.

The main object of this invention is to provide a cutting element of the kind described with an alternative form of non-cutting surfaces to limit the depth of cut, this alternative form having advantages in some applications, as will appear below.

The invention accordingly provides a cutting element of the kind described wherein non-cutting surfaces to limit the depth of cut are provided in the form of embossed or otherwise formed protuberances on an otherwise flat or smoothly curved sheet or strip.

Various embodiments of the invention will now be described by way of example with reference to the accompanying diagrammatic drawings in which:

Figure 1 is a partial plan view of a first form of cutting element;

Figures 2 to 5 are sections through one tooth of the element illustrating the various stages of its manufacture;

Figures 6 and 7, 8 and 9, and 10 and 11 are respectively plans and sections corresponding to Figures 1 and 5 of three modifications of the first form of cutting element;

Figure 12 is a section through one pair of teeth of a second form of cutting element;

Figure 13 is a section through a tooth of a third form of cutting element, showing also a punch and die for forming it;

Figure 14 is a partial plan view of a fourth form of cutting element;

Figures 15 to 17 are sections through one cutting edge of the element of Figure 14, illustrating stages of its manufacture, and Figures 18 to 20 are sections corresponding to Figures 15 to 17 illustrating a modification of the third form of element.

Figures 21 and 22 are respectively a plan and a section, corresponding to Figures 1 and 5, of the further form of element.

Referring to the drawings, the element of Figures 1 to 5 is made from a rectangular piece of strip steel (shown only in part) and is suitable for attachment to a support such that the combination forms a tool equivalent to an ordinary hand file or rasp. The cutting element is formed from a rectangular blank of hardenable steel which is punched with a series of lines of similarly oriented D-shaped holes 2, the lines extending across the width of the blank: Figure 2 shows the blank after punching. The straight marginal portions of the holes 2 are then upset all to one side of the blank and all facing in the same direction, to form the tongues 3 shown in Figure 3; the tongues are in the process sheared from the remainder of the blank along parallel lines 4 running perpendicularly to the straight margin of the hole 2. The tongues are then ground off flat in a single overall grinding operation. The resulting sharpened tongues 5 (Figure 4) have zero clearance angles and positive rake angles R and lie adjacent one face 6 of the blank. In the next operation each sharpened tongue is corrugated to provide the desired clearance angle C' (Figure 5) by the displacement of the portion 7 of the tongue near its root 8 away from the face 6 of the blank and the progressive bending of an intermediate portion 9 of the tongue towards the face 6. The tooth 10 so formed has a rake angle R', and it will be appreciated that $R'=R-C'$. Besides producing the desired rake and clearance angles the corrugating step brings the edges 11 of the tooth 10 beyond said face 6. In the same operation a series of dimples 12 are embossed in the blank, one between each pair of holes 2 in a line and somewhat forwardly of the corresponding cutting edges 11 of the teeth 10, the metal being displaced beyond the same face 6. The corrugating and embossing are such as that the edges 11 of the teeth 10 are spaced only a short distance from the surface of the element and the edges 11 lie beyond the dimples 12 by the desired maximum depth of cut D. The element is finished by a hardening treatment (e.g. if the element is of mild steel it may be case-hardened by a cyanide treatment).

The clearance and rake angles C', R' respectively as well as maximum depth of cut D will be made suitable for the materials the element is to cut. For hard wood, soft metals or plastics C' may be 15°–25°, R' 45°–35° and the cutting edges 11 and dimples 12 upset from the adjacent face 6 of the element by .015" and .005" respectively, giving a maximum depth of cut D of .010". For softer materials the angle of rake R' and the depth of cut D may be greater: for harder materials they should be less.

It is naturally important that the dimples 12 which form the depth control surfaces should present an area to the work sufficient to prevent their sinking into it under normal working pressures between work and tool. The necessary area will be greater on soft materials than on harder ones. It is also necessary that the dimples 12 be near enough to the cutting edges 11 to exercise the desired control on the depth of cut. This is especially important when the work or the cutting element is curved.

In the modification of the first form of cutting element which is shown in Figures 6 and 7 the depth-control surfaces 12' are located just in front of the lines of edges 11 of the teeth 10 and are formed by corrugating the element between holes 2, instead of by embossing dimples. This corrugating can be done by a single tool for each line of holes 2. The element of Figures 6 and 7 is otherwise similar to that of Figures 1 to 5. It will be appreciated that the element as a whole is not corrugated and that the corrugations 12′ are little impediment to bending the element transversely to their length if this should be desired, since adjacent corrugations 12′ are not continuous but are separated by a hole 2. Moreover the corrugations 12′ are rather nearer the edges 11 (in the direction of cut) than are the dimples 12 of Figures 1 to 5, and can thus exert better control over the depth of cutting.

The modification of Figures 8 and 9 has its depth-control surfaces 12″ in the form of ramp-like tongues struck out of the blank, one at each hole opposite the tooth 10: the element of these figures is otherwise identical with that of Figures 1 to 5.

The modified element of Figures 10 and 11 differs from that of Figures 1 to 5 in having rectangular holes 2′ and not D shaped holes, and by its depth-control surfaces 12‴ being in the form of ramp-like tongues struck out of the blank one at the side of each hole opposite the tooth 11: the tongues 12‴ differ in area and shape from those of Figures 8 and 9, and can be brought closer to the cutting edges 11 while still allowing room for chip discharge.

The second form of cutting element, shown in Figure 12 has a series of rectangular holes 21 arranged in the same manner as those of Figure 10: the long sides of the holes 21 are formed with teeth 22, 23, each tooth being similar to the tooth 10 of Figures 1 to 5 and formed in the same way. The tips 24, 25 of the cutting edges 22, 23 are brought out beyond opposite faces of the element, and the rearward rounded portion 26 or 27 of one cutting edge 22 or 23 forms the depth control surface for the other cutting edge: the element is able to cut on both faces and may have one face suitable for cutting one material and the other for a different material. There is of course no need to provide dimples or the like as their function is performed by the surfaces 26, 27.

The third form of cutting element (Figure 13) has a series of D-shaped holes 2 and ramp-like tongues 12″ as in Figure 8, but its teeth 10′ differ from those of the preceding figures in not being corrugated. They are formed by punching, upsetting and grinding in the same way as the teeth 10 and shown in Figures 2, 3 and 4, but while the teeth 10 are corrugated (Figure 5) the teeth 10′ are simply set down by means of the punch 30 and die 31 of Figure 13. The punch 30 has locating finger 32 which enters the hole 2 against the side thereof opposite the tooth 10′: the punch has also an inclined surface 33 which defines the final position of the tooth 10′ and a land 34 which contacts the face of the blank opposite the face 6 as the punch descends and thereby checks the travel of the punch. A lug 35 on the punch shears and upsets the tongues 12″. Since the punch is located with respect to the blank and its travel is checked by the blank itself the tooth 10′ is accurately formed and the uncertainties associated with indirect control of the punch are avoided. In practice a series of punches 30 will be grouped together in a holder and reciprocated together by means of a conventional press.

It will be obvious to the skilled reader that the teeth 10 of Figures 1 to 11 can be made in the same general way as the Figure 13 tooth 10′, by providing a lip on the die beneath the root portion 7 of the tooth and replacing the land 34 by a curved surface complementary to the lip. The tongues 12″ and 12‴ of Figures 8 to 11 can be made with the same punch as forms the teeth 10, as in Figure 13.

The advantage of the Figure 13 tooth, 10′, lies in the simplicity of tooling required to make it. It will be clear however that the cutting edge 11′ must project further from the blank face 6 than the cutting edge 11 in Figure 5, for a given clearance angle, since none of the length of the tooth is absorbed in the corrugation. Were it not for the depth control surfaces provided by the tongues 12″ the projection would be so great as to make the cutting element useless. However these tongues can be upset to any desired distance to reduce the maximum depth of cut D to a desired value, say .010″.

It will be appreciated that all the cutting elements so far described can be bent easily in any direction into part-cylinders or the like: certain curved tools are shown for example in the specification above referred to. The ease of bending of the illustrated elements is in contrast to those of British specifications Nos. 695,859 and 695,-830 where the ridges prevent easy bending except in a single direction. Where the radius of bending is small and the teeth face axially it will generally be better to make the teeth so that, in flat condition, the cutting edges project more at their mid-point than at their ends: thus after bending the edges are coaxial with the bent element.

The fourth form of cutting element, shown in Figures 14 to 17 has a different form of cutting edge to that previously described. The element has its teeth 41 in a series of parallel equidistant transverse lines, the edges in adjacent lines being staggered, and is made as follows. A continuous strip of steel is fed intermittently through a two-stage multiple punch by steps equal to twice the distance between adjacent lines. In the first stage the strip is sheared by a shallow punch and correspondingly-shaped die in preparation for the formation of the cutting edges on two lines: for each cutting edge this shearing defines a rectangular tongue portion 42 (Figure 15) the forward edge of which is raised by the thickness of the strip and only the rear of which remains continuous with the body of the strip. In the second stage the free (i.e. forward) end portion of each tongue portion 42 is punched out by sharp punches of rectangular cross-section moving into closely fitting recesses in dies which support the remainder of the sheared rectangular portions, leaving the tongue 42 with a cutting edge 43. In the same stage another punch forms a shallow ridge 44 in the metal just ahead of the tooth 41. The result of this operation is indicated in Figure 16.

In the next operation the tongues 42 are pushed back whereby the tooth receives its final shape, with clearance and rake angles C″, R″, the depth of cut being limited to the amount D. The element is completed by a hardening treatment (e.g. if of mild steel it may be cyanide-hardened).

The form of cutting element illustrated in Figures 14–17 differs from those of Figures 1 to 13 in that while the latter may conveniently have teeth of small included angle (say 30°–45°) the former is preferably made with larger included angles (say 60°) to avoid difficulty in the shearing operation illustrated in Figure 16. Thus the cutting element of Figures 14–17 is more suitable for hard materials.

In the modified form of the fourth element shown in Figures 18 to 20 the depth-control surfaces 44′ are formed by a turned-up ramp like portion very like the portion 12‴ of Figures 10 and 11. The method of making this element differs from that of Figures 14 to 17 in that a triangular depression 45 is first formed in the blank (Figure 18), the apex thereof is punched out (Figure 19) by a symmetrically acting punch and the tongue 42′ and ramp-like portion 44′ are set back to the desired positions (Figure 20).

The cutting elements of Figures 14 to 20 can be bent easily parallel to the lines of teeth 41: they can be modified by arranging the teeth 41 more or less radially on a circular or annular blank to provide a flat or conical rotary cutting tool.

It will be obvious to the skilled reader that many variations can be made in the embodiments of the invention described; moreover features of one embodiment may be used in another as exemplified in the element of Figures 21 and 22 which is essentially the Figure 12 cutting element modified to have teeth 10′ such as shown in Figure 13 and depth-control surfaces in the form of dimples 50. One dimple 50 is embossed at the root of each tooth 10', the dimple at one tooth root projecting from the face from which the other tooth projects. By avoiding the corrugating step the tooling required for the element of Figures 21 and 22 is simpler and less costly than that of Figure 12.

We claim:

1. For a cutting or abrading tool, a cutting element consisting of a generally planar metal sheet having a multiplicity of holes each with a straight marginal portion forming a tooth, said tooth comprising a root portion bent away from the surface presented to the work to form a protuberance on the surface opposite said last mentioned surface of the sheet, then a reversely bent portion beyond said surface presented to the work in a direction away from said opposite surface, and terminating in an end portion carrying the cutting edge and extending beyond said last mentioned surface and noncutting surfaces to limit the depth of cut of said teeth which surfaces are provided by portions raised from the sheet.

2. A cutting element as claimed in claim 1, having similar teeth extending from both surfaces of the sheet and facing in opposite directions, the protruding portion of one tooth providing said non-cutting surface for a tooth projecting opposite to said one tooth.

3. For a cutting or abrading tool, a cutting element comprising a metal sheet having a multiplicity of holes one edge of each hole projecting beyond the surface of the sheet providing a cutting edge, the cutting edges all facing the same general direction and having uniform projection beyond the general plane of the sheet with positive rake and clearance angles and at least part of the edge of each hole opposite the cutting edge being bent out of said general plane on the same side thereof as the cutting edge but projecting to a lesser extent to provide a noncutting ramplike tongue to limit the depth of cut of said cutting edge, said sheet, apart from the tongues and the teeth, presenting a smooth line as seen in any section over the area containing the teeth.

References Cited in the file of this patent

UNITED STATES PATENTS

| | | |
|---|---|---|
| 2,358,109 | Simon | Sept. 12, 1944 |
| 2,678,571 | Booth | May 18, 1954 |
| 2,708,376 | Booth | May 17, 1955 |
| 2,769,225 | Booth | Nov. 6, 1956 |
| 2,823,562 | Humbarger | Feb. 18, 1958 |